United States Patent [19]

Whelan et al.

[11] 4,143,175

[45] Mar. 6, 1979

[54] CHEESE FOOD PRODUCT

[75] Inventors: Richard H. Whelan, Medfield; Frank R. Conant, Lexington, both of Mass.

[73] Assignee: CPC International Inc., Englewood Cliffs, N.J.

[21] Appl. No.: 804,952

[22] Filed: Jun. 9, 1977

[51] Int. Cl.² ............................................. A23C 19/12
[52] U.S. Cl. .................................... 426/582; 426/573
[58] Field of Search ................. 426/36, 582, 589, 573

[56] References Cited

U.S. PATENT DOCUMENTS 4,032,669   6/1977   Peters et al. ................... 426/582 X

OTHER PUBLICATIONS

Kosikowski F., Cheese and Fermented Milk Foods, published by the Author, Cornell University, Ithaca, N.Y., 1966 (pp. 158, 166, 167, 295 & 296).

Primary Examiner—David M. Naff

[57] ABSTRACT

An acid-stable, heat-reversible, cheese-like gel is prepared using a mozzarella cheese, an acidulant, and a locust bean gum/xanthan gum stabilizing system.

6 Claims, No Drawings

CHEESE FOOD PRODUCT

This invention relates to a cheese food ingredient which is acid stable and useful in a shelf stable pizza sauce which requires a high acid food pasteurization process. The cheese food ingredient is prepared in the form of a heat reversible gel which has a thermoplastic structure similar to mozzarella cheese used in freshly prepared or frozen pizza formulations having, to a limited degree, the stringiness characteristic of natural mozzarella cheese.

BACKGROUND OF THE INVENTION

It is customary to have a cheese component in the topping of a pizza or similar Italian type pasta or sauced product. Such cheese component is usually applied to the pizza or other product after the tomato or other sauce has been cooked and is applied to the pastry shell or other product to be topped. The topped combination is then baked in an oven until the cheese is melted and achieves the now expected stringy consistency.

In attempting to prepare a shelf stable spreadable pizza topping sauce (a product which does not require refrigeration) containing cheese, it was determined that the cheeses and cheese food products usually used in fresh or frozen products would not retain their organoleptic properties when subjected to the high temperature processing necessary in the preparation of high-acid sauce combinations. It was desired to produce a sauce in which the cheese ingredient retained its particulate character and later achieved the meltdown and stringiness similar to mozzarella cheese when used as a topping on a variety of foods.

In using conventional cheeses, the following problems were encountered in these specific alternatives for the processing of the tomato sauce phase.

Retort processing, both agitated and static, proved unsatisfactory due to severe browning of the sauce and cheese phases. The cooked flavors imparted were unacceptable. Real mozzarella cheese was added to a tomato sauce, a low acid product which required retort processing. The cheese completely melted and lost its cheese character when the container was agitated during heating for the necessary time and temperature conditions to prepare the product. If such agitation was not present the sauce component in contact with the edges of the container would brown excessively. Usual tomato sauce products are somewhat less viscous than the desired product and tend to heat more uniformly without agitation. Examples of such products are Ragu and Progresso spaghetti sauces. Another product, Libby's Spred'n Heat Pizza flavored spread, is an homogeneous product resulting from use of cream cheese and retort processing. While giving adequate flavor response, there is no hint of particulate cheese in that product. Conventional cheese again proved unacceptable due to melting and blending.

Retort processing was also attempted using Nestle Fid-Bits ® cheese analogue. These "cheese" bits were heat stable and did not melt in processing, but also failed to soften as the product was heated and in fact hardened when heating an english muffin topped with the cheese/tomato sauce product.

Aseptic processing was unacceptable due to the necessity of adding the cheese prior to passing the cheese containing tomato sauce through a heat exchanger and the resultant cheese melt during the high temperature and shear. It is to be noted that both the agitated retort process and the aseptic process have commercial limitations due to the necessity of specialized glass handling techniques.

When a synergistic preservation system, i.e., reduced pH, reduced water activity ($A_w$), and pasteurization was used, there were resultant losses of tomato sauce identity and sensory limitations in the nature of the development of dry, pasty, salty or sweet flavors in the sauce due to high solute concentrations required for $A_w$ control. It was determined that stable products had unacceptable flavor characteristics and those sauces that had acceptable flavor were unstable and would support microbial growth.

In hot fill/low pH processing, the cheese demononstrated a sandy texture due to the low pH (near its isoelectric point) and developed sour off flavors. The cheese melted down during the processing operation. Sauces prepared using this method were essentially homogeneous mixtures with the melted cheese component incorporated in the tomato sauce.

Then an attempt was made to reduce the pH in natural mozzarella with the use of an acidulation process. This was accomplished by soaking the cheese in an acidified medium which resulted in an elevated moisture content, graininess and the lack of homogeniety of acid penetration. The resultant cheese lacked the melt stability required for subsequent pasteurization processing into the pizza sauce spread product.

It was thought that it would be possible to modify the natural cheese to become heat and acid stable and several stabilizer approaches were tried and found to be unacceptable. These approaches included a shortening, distilled monoglyceride (Myverol blend) and amioca starch stabilization system, a phosphate/citrate stabilizer and powdered milk and emulsified oil (Myverol blend) system, a locust bean gum and phosphate/citrate stabilization (disodium phosphate, sodium aluminum phosphate) system, a locust bean gum and citrate stabilization system, a locust bean gum and phosphate citrate stabilization and emulsified oil (Myverol blend) system, and a locust bean gum and phosphate/citrate stabilization and emulsification and wheat gluten (for bodying) system.

It is to be noted that locust bean gum/xanthan gum stabilizing systems are well known for use in heat reversible gels for salad and/or dessert uses. These uses in edible products are such that the pudding or aspic or other stabilized aqueous system will melt down in the mouth giving the impression of smooth or ultrasmooth consistency. Such uses permit the preparation of instant puddings, aspics and dietetic jellies, imitation sour cream, pie fillings and freeze-thaw resistant puddings.

SUMMARY OF THE INVENTION

The present invention provides an acid stable, heat reversible cheese-like gel and a process for preparing the same. The process comprises mixing natural cheese with an acidulant and a locust bean gum/xanthan gum stabilizing system. In its preferred embodiment the process comprises mixing of a comminuted mozzarella, provolone and romano cheeses in a heat exchanger with an aqueous slurry of citric acid, sodium citrate, sucrose, potassium chloride, and locust bean gum, after which a slurry of xanthan gum and olive oil is added to the mixture. The resultant mixture is agitated at 79°–93° C. for from 5 to 30 minutes. The final composition will generally have a moisture content of 60 to 64%, fat content of 12 to 16% and protein content of 14 to 17%.

DETAILED DESCRIPTION OF INVENTION

The cheese food product of the present invention is prepared by shredding mozzarella and provolone cheeses and adding these and grated romano cheese to a mixer cooker. By mozzarella cheese it is understood that any of the varieties including whole milk mozzarella, low moisture whole milk mozzarella, part skim mozzarella, and low moisture part skim mozzarella may be used alone or in combination with other members of this group. Typical of the mixer cookers used are steam injected high shear mixers (Waring type), or screw mixers (Reitz or Damrow type), as well as surface heating screw mixers (Reitz type) or a Sigma style mixer (J. H. Day).

To this mixture is added an aqueous dispersion of citric acid, sodium citrate, sucrose, potassium chloride, locust bean gum and potassium sorbate. This dispersion is prepared in a high shear mixture until a homogeneous slurry is produced. Typical high shear mixers include Waring blender and the Lanco mixer. If a direct steam injection cooker is used, reductions in the slurry moisture must be made to compensate for the addition of water in such processing.

This locust bean gum slurry is added directly to the cheese mixture followed by the addition of a xanthan gum/olive oil slurry. Agitation is begun with cooking at from about 80° C. to about 93° C. In a screw type cooker, agitator rpm may vary from 20 to 100 rpm, mixing and heating time may vary from 2 to 30 minutes. The final composition of the cheese food product generally has about 60 to 64% moisture content, but the moisture content may be within the range of about 55 to about 70% depending upon required final structure. Fat content will be from about 12% to about 16%, pH from about 4.1 to about 4.4, protein from about 14% to about 17%.

This cheese food product may be filled into any standard size block or slab as desired (e.g., 5, 10, 20 or 40 pound) and cooled. After cooling, to about −1.1° to +4.4° C., the cheese is cut and shredded as desired for use in the hot sauce product formulation.

The cheese food product may also be prepared utilizing more sophisticated methods such as a master batch premix which is cooked in segments and then extruded onto a continuous chill-belt to form variously sized slices or slabs. These slices or slabs can then be further cut or shredded for use in the hot sauce as indicated above.

The following examples describe the preferred embodiment of the invention and the limits at which acceptable products of the invention may be formed.

EXAMPLE 1

In a one gallon Waring blender 2.31 grams citric acid, 1.67 grams xanthan gum (Keltrol Ktl 27580, Kelco Company), 1.67 grams locust bean gum, 1.49 grams sucrose and 1.59 grams sodium citrate were mixed together and added to 41.8 grams of water. This mixture was mixed and heated at the same time until well blended. Then 72.66 grams of whole milk mozzarella cheese and 11.58 grams provolone cheese were added gradually and continuously blended in the mixer. The temperature was raised up to about 74° C. The cheese was mixed until homogenized and then poured. While the cheese flavor was not strong enough, the cheese product did hold up when stirred vigorously into a 93° C. acid sauce. The product grated well and appeared to be slightly too moist.

EXAMPLE 2

231.99 Grams of whole milk mozzarella cheese and 22.23 grams provolone cheese were melted in the top of a double boiler. 7.58 Grams of citric acid, 5.27 grams xanthan gum, 5.27 grams locust bean gum, 5.04 grams sodium citrate and 4.72 grams of olive oil were added to a blender and were mixed at stir speed with 15 grams of olive oil until the mixture was well blended. In turn this gum mixture was heated resulting in a relatively smooth mixture. This smooth gum mixture was stirred into the melted cheese while still being heated in the double boiler. When all these ingredients were well blended, having the consistency of a roux, 135.8 grams of water were added to the mixture. This was stirred in a blender and whipped at high speed until a homogeneous mixture was obtained. The resultant cheese product had a fairly homogeneous texture and a slight sandy taste. The flavor was very definitely that of cheese.

EXAMPLE 3

510 Pounds of whole milk mozzarella cheese is shredded and loaded with 61 pounds shredded provolone cheese, and 60 pounds grated romano cheese into a ribbon mixer-cooker (1000 pounds capacity Reitz type with steam injection heating).

335.6 Pounds of aqueous slurry (282.2 pounds water, 11.6 pounds locust bean gum, 3.2 pounds potassium chloride, 10.0 pounds sucrose, 11.1 pounds sodium citrate, 16.5 pounds citric acid, 1.0 pound potassium sorbate) is prepared in a Lanco high shear mixer at 1000–1800 rpm until a homogeneous mixture is obtained (10 minutes). The slurry is pumped into the cooker. Direct steam injection cooking is used, so appropriate moisture reductions must be made in the slurry (steam moisture pickup varies from 20 to 80 pounds per 1000 pounds of product depending upon steam quality).

28.2 Pounds of olive oil/xanthan gum mixture (15.0 pounds olive oil, 13.2 pounds xanthan gum) is prepared by hand mixing and is then added to the cooker. Agitation at 120 rpm is begun for 10–20 minutes followed by cooking to 93° C. in 4–6 minutes. The overall mixing and heating time may vary from 14–16 minutes.

Final composition of the product is preferably 62–63% moisture. Moisture lower than about 60% results in occasional processing failure due to oiling off and also produces a sandy textured product. Moisture above about 64% results in a product of inadequate shredding properties due to softness. (In some instances this might be a desired characteristic but not for the pizza application.) Fat content ranges from 12–16%, pH from about 4.1–4.4, and protein from about 14–17% depending upon composition of the mozzarella cheese used.

The product may be filled into any standard size cheese block or slab as desired (e.g., 5, 10, 20 or 40 pounds) and cooled. Generally sizes of 20 pounds or smaller are preferred due to more rapid cooling which favors a more uniform white appearance.

EXAMPLE 4

A master batch of product is prepared by combining all the ingredients in a ribbon blender and agitating to produce a uniform mixture. The present example details a 1000 pounds batch using a low moisture part skim mozzarella cheese.

479.8 Pounds of low moisture part skim mozzarella cheese, 61.0 pounds provolone are shredded and added to the mixer followed by 60.0 pounds grated romano cheese.

370 Pounds of aqueous slurry (317.8 pounds of water, 16.5 pounds citric acid, 11.6 pounds of locust bean gum. 11.1 pounds sodium citrate dihydrate, 10.0 pounds of sucrose, 3.0 pounds of potassium chloride, 1.0 pound potassium sorbate) is prepared in a Lanco mixer then added to the ribbon blender.

28.2 Pounds of olive oil/xanthan gum slurry (15.0 pounds olive oil + 13.2 pounds of xanthan gum) hand stirred, is added to the ribbon blender.

While continuing to agitate at about 18 rpm, 220 pounds of the cold mixed product is transferred to a second screw-type mixer equipped with direct steam injection (Damrow type). The sub-batch is cooked to 93° C. in 2 minutes at 120 rpm then discharged into blocks of desired sizes or extruded onto a continuous chill belt to form slices, slabs or ribbons of rapidly cooled cheese product. This process has the advantage of rapid cooling which preserves the product color. The slices or slabs can then be further shredded or sliced for subsequent uses.

Product from either process is cooled to about 1.6° to 4.4° C. then sliced into slabs which are shredded. The shredded cheese is then collated with hot sauce and packaged.

It was determined that a quite suitable cheese food product could be prepared comprising in its cheese components from about 55% to about 45% mozzarella cheese, such mozzarella being either whole milk mozzarella, or low moisture whole milk mozzarella, or part skim mozzarella, or low moisture part skim mozzarella, from about 0% to about 15% provolone cheese, and from about 15% to about 0% romano cheese (grated), in its added aqueous phase about 1.5% to about 0.8% locust bean gum and about 25% to about 35% water, and in its oil phase about 0.8% to about 1.5% xanthan gum.

It was found that care must be used in keeping the moisture content of the cheese food gel within proper limits. It is necessary to have sufficient moisture present in the cheese and in added water to prevent a broken emulsion with resultant oiling off. It is believed that the hydrophilic nature of the hydrocolloidal gums is responsible for the critical moisture balance. Insufficient moisture causes dehydration of the cheeses and failure of the gel system. Also it appears that the dehydration of the cheese protein results in a sandy or grainy mouth feel on consumption in the final product. This is also due to pH below the isoelectric points of the casein.

It is not as critical with respect to the upper limits of moisture in the gel system. We have found that as moisture is added, the gel gets softer. It has been found convenient to have the gel cut into blocks or chunks which can be shredded at a refrigerated temperature of about −2.2° C. If the cheese gel has a plasticity or body as measured by the following penetrometer test it will be in a desired range for incorporation into our process.

Using cheese cooled and tempered to 3.9° C. ± 0.6° C. for at least 24 hours, a sample piece (about 152.4 millimeters square) is removed from the center of a block. The sample is centered under the test cone (5° incline aluminum cone with a 150 gram load) and the cone is adjusted to just touch sample surface. The plunger of the penetrometer (Precision Universal Model) is released for 5 seconds. The penetromer indicator is then moved forward to indicate depth of penetration. (Three such readings are taken per sample.) The average reading for acceptable cheese is 20.0–34.0 tenths of a millimeter (2.00–3.40 millimeters).

It has been determined that the moisture content will preferably be in the range of about 60% to about 64%, but may be varied within the range of about 55% to about 70% depending upon the balance of the ingredients present and the desired end use of the cheese-like gel system.

A preferred formulation for the cheese product of this invention using whole milk mozzarella cheese is as follows:

| | |
|---|---|
| Whole Milk Mozzarella | 51.00 |
| Provolone Cheese | 6.10 |
| Romano Cheese (Grated) | 6.00 |
| Citric Acid | 1.65 |
| Sodium Citrate | 1.11 |
| Sucrose | 1.00 |
| Potassium Chloride | 0.32 |
| Locust Bean Gum | 1.16 |
| Water | 28.74 |
| Potassium Sorbate | 0.10 |
| Olive Oil | 1.50 |
| Xanthan Gum | 1.32 |

A preferred formulation for the cheese product of this invention using low moisture skim milk mozzarella cheese is as follows:

| | |
|---|---|
| Low Moisture, Part Skim Milk Mozzarella | 47.98 |
| Rindless Provolone | 6.10 |
| Grated Romano Cheese | 6.00 |
| Anhydrous Citric Acid | 1.65 |
| Olive Oil | 1.50 |
| Xanthan Gum | 1.32 |
| Sifted Locust Bean Gum | 1.16 |
| Sodium Citrate Dehydrate | 1.11 |
| Sucrose | 1.00 |
| Potassium Chloride | 0.30 |
| Potassium Sorbate | 0.10 |
| Water | 31.78 |

The cheeses may be varied to alter the flavor response of the final product. Sucrose and potassium chloride are used to help balance the flavor of the product and may be altered as required. In place of citric acid other food grade organic and mineral acid acidulants such as phosphoric acid or lactic acid may be added to adjust the pH to yield 4.1–4.4. Potassium sorbate is added as an antimycotic.

It is well known that milk protein caseins exhibit minimum solubility at the isoelectric region of pH 4.5 to 5.0. In this range these proteins are in a state of reduced hydration, and are particularly susceptible to heat denaturation which results in a curdled (often lumpy or grainy) product. In normal process cheeses, the stabilization is accomplished by using phosphates which tend to raise the pH to 5.6 to 5.8, yielding a smooth texture. For the proposed use incorporating the cheese ingredient into the tomato product, such normal cheese are unacceptable due to the necessity to assure that the final product has an overall pH of 4.3. Soaking of normal phosphate stabilized cheese in acid solution would lower the cheese pH and minimize the effectiveness of the stabilizers, and residual cheese alkalinity causes possible elevation of the overall product pH. The major benefit of using the gum stabilized system of the invention (rather than the phosphates commonly used in cheese processing) for stabilizing the cheese gel is that pH has little or no effect upon the efficiency of the stabilizers.

The Fid-Bits ® used in earlier retort experiments were unacceptable when using the low pH pasteurization approach of the invention because of their high pH.

It has been determined that the product of this invention is especially useful as a component in high acid sauces such as those containing tomatoes where low-pH hot-fill process is required in order to give shelf stability and an acceptable product free of deleterious contamination. Product of the invention does not lose its character during the processing or afterwards in the stored sauce product and simulates fresh whole milk mozzarella with the exception of characteristic melted stringiness when the product is put on a heated food product and/or heated on a food product.

A tomatoey pizza sauce may be prepared containing tomato paste, romano cheese and appropriate Italian seasonings, olive oil and spices. The pH of this pizza sauce was in the range of 4.1 to 4.4. This sauce had been cooked by simmering at about 93° C. or rapidly by a continuous processing system. The cheese food ingredient of this invention was cut into fragments or chunks and added to the cooked pizza sauce by a gentle mixing means such as a screw-type conveyor and then hot filled at about 77° C. to about 80° C. into suitable containers such as wide mouth jars and then capped and pasteurized in an atmospheric pressure retort at about 99° C. to achieve a temperature in the center of the product of about 91° C. for about 3 minutes.

The resulting product had discrete cheese-like chunks in the sauce which melted, but did not string like pizza cheese when the product was spread on a hot English muffin and further heated or browned on the top in a toaster or other suitable oven.

It will be obvious to those skilled in the art that various changes may be made without departing from the spirit of the invention and, therefore, the invention is not limited to what is described in the specification but only as indicated in the appended claims.

We claim:

1. An acid stable cheese containing gel consisting of an aqueous dispersion of natural cheese consisting of from about 55 to about 45% mozzarella cheese selected from the group consisting of whole milk mozzarella, low moisture whole milk mozzarella, part skim mozzarella and low moisture part skim mozzarella and combinations thereof, from about 0 to about 15% provolone cheese, and from about 15% to about 0% romano cheese, and an acidulant selected from the group consisting of food grade organic acids and food grade mineral acids in an amount sufficient to lower the pH of the cheese containing gel to from about 4.1 to about 4.4, from about 1.5 to about 0.8% locust bean gum and from about 0.8 to about 1.5% xanthan gum such that the moisture content of the cheese containing gel is in a range sufficient to prevent the emulsion from breaking while permitting the emulsion to be shredded at about −2.2° C.

2. The cheese containing gel of claim 1 wherein the ratio of xanthan gum to locust bean gum is in the range of from about 2 to 1 to about 0.5 to 1.

3. The cheese containing gel of claim 1 wherein the acidulant is selected from the group consisting of citric acid, lactic acid and phosphoric acid.

4. The cheese containing gel of claim 1 wherein the moisture content is in the range of from about 60% to about 64%.

5. The cheese containing gel of claim 1 consisting of 51.00% whole milk mozzarella cheese, 6.10% provolone cheese, 6.00% grated romano cheese, 1.65% citric acid, 1.11% sodium citrate, 1.00% sucrose, 0.32% potassium chloride, 1.16% locust bean gum, 28.38% water, 1.50% olive oil, and 1.32% xanthan gum.

6. The cheese containing gel of claim 1 consisting of 47.98% low moisture part skim mozzarella, 6.10% provolone cheese, 6.00% grated romano cheese, 1.65% citric acid, 1.50% olive oil, 1.32% xanthan gum, 1.16% locust bean gum, 1.11% sodium citrate, 1.00% sucrose, 0.30% potassium chloride, 0.10% potassium sorbate, and 31.78% water.

* * * * *